United States Patent [19]

Hong et al.

[11] Patent Number: 4,693,899

[45] Date of Patent: Sep. 15, 1987

[54] METHOD FOR PREPARING FILLED COOKED DOUGH PRODUCT

[76] Inventors: Leon Hong, 81 Coalpit Rd., Danbury, Conn. 06810; John J. Balboni, Nash Rd., Purdys, N.Y. 10578

[21] Appl. No.: 736,800

[22] Filed: May 22, 1985

[51] Int. Cl.$^4$ .................. A21D 13/08; A21D 15/02
[52] U.S. Cl. ............................ 426/94; 426/242; 426/556
[58] Field of Search ............ 426/94, 95, 242, 243, 426/128, 556

[56] References Cited

U.S. PATENT DOCUMENTS

| | | | |
|---|---|---|---|
| 2,834,677 | 5/1958 | Geisler | 99/1 |
| 3,532,510 | 10/1970 | Zimmerman | 99/86 |
| 3,615,678 | 10/1971 | Tangel | 426/94 |
| 3,615,679 | 10/1971 | Tangel | 99/85 |
| 3,656,967 | 4/1972 | Barton et al. | 426/275 |
| 3,719,138 | 3/1973 | Blaetz et al. | 99/192 |
| 4,020,188 | 4/1977 | Forkner | 426/95 |
| 4,171,380 | 10/1979 | Forkner | 426/95 |
| 4,207,348 | 6/1980 | Vermilyea et al. | 426/95 |
| 4,390,555 | 6/1983 | Levinson | 426/234 |
| 4,400,404 | 8/1982 | Persi | 426/549 |

FOREIGN PATENT DOCUMENTS

| | | |
|---|---|---|
| 0088361 | 9/1983 | European Pat. Off. . |
| 1506037 | 4/1978 | United Kingdom . |

*Primary Examiner*—George Yeung
*Attorney, Agent, or Firm*—Thaddius J. Carvis

[57] ABSTRACT

A composite filled uncooked dough product is prepared by completely enclosing a yeast-leavened, sugar-containing dough around a cooked freeze/thaw stable viscous filling comprised of particulate food ingredients and a sauce therefor containing a water-binding carbohydrate. The product is cooked for consumption to a degree sufficient to develop in the dough a firm crust and a tender interior crumb structure. The cooked product is particularly adapted to be frozen for reheating at the time of consumption. A reheating procedure comprised of conventional oven heating either simultaneous with or following microwave heating returns the frozen product to the appearance and texture of the freshly-cooked product.

7 Claims, No Drawings

METHOD FOR PREPARING FILLED COOKED DOUGH PRODUCT

TECHNICAL FIELD

The present invention relates to filled, cooked dough products of the type wherein a relatively high-moisture food filling is encased or enclosed by a bread-like casing having a desireably fresh-tasting texture which includes a typical outer crust and a soft internal crumb. The invention provides formulations for such products which render them uniquely adapted to freezing and reheating by a combined heating technique which achieves the desired texture even after long periods of frozen storage.

Products involving combinations of an edible food filling and a cooked dough have, of course, been enjoyed by consumers for ages, running the gamut from sandwiches in which a filling is arranged or spread between two or more pieces of bread, to pastry items in which a cream or fruit filling is substantially encased with a cooked dough. However, it has not heretofore been possible to retain for long periods of storage the textural integrity and contrast afforded by a freshly prepared filled bread product where the filling is of relatively high moisture and the outer dough has a crisp, bread-like crust and a soft, but not soggy, internal crumb.

The popularity of such items as freshly prepared, largely can be attributed to the seemingly unlimited variety of combinations which can be prepared and the ability to enjoy, together, the desirable eating characteristics of both the cooked dough product and the food filling, very often producing enhanced eating and organoleptic properties as compared to the individual components. This desirable combination of taste and texture attributes is typically greatly diminished with storage.

These desirable attributes are easily and readily obtained when the product is prepared directly by the consumer or is served to and eaten by the consumer within a short time after preparation. In these circumstances, the individual components of the product are fresh and any time-dependent processes which could lead to an undesirable product (for example, staling of the cooked dough portion or its degradation in the presence of liquid from the filling) are of little concern.

In this age of consumer convenience, however, it has become necessary to address the fact that a wide segment of the population has little time for, or interest in, actually preparing fresh food items of this type, particularly where the preparation of the product involves any degree of cooking requiring the time or attention of the consumer. This is the case, for example, as to products such as grilled sandwiches or products involving a cooked meat, vegetable, cheese, egg or other like filling to be placed inside a dough. In addition, many persons desire such products at times and locales which do not coincide with those in which it is possible to have access to the required fresh ingredients and appropriate cooking utensils.

As a result of these considerations, attention has been directed to the provision of fully-prepared cooked dough/filling products which can be purchased by the consumer and eaten without need for involved preparation. Because such products are pre-assembled, it is necessary that they be formulated and/or processed so as to be "stable" from the point of pre-preparation until eventual consumption, such stability being in terms of both overall stability against spoilage as well as in the sense of stability against textural and organoleptic changes which would render the product distinctly different from, and less desirable than, its freshly-prepared counterpart.

Among the most important considerations in providing a stable, pre-prepared cooked dough/filling product is the adverse affect of moisture in the filling portion of the product migrating to the cooked dough, thereby rendering the cooked dough soggy and hastening the onset of degradative reactions. One means for dealing with this problem is the provision of products in which the filling has a very low moisture content. However, many of the fresh-baked counterpart products are desired precisely because they possess a filling high in moisture and, hence, the provision of stable products having low moisture fillings generally is not an acceptable route to meeting consumer needs. Other products have been suggested wherein the filling is of the intermediate-moisture variety whereby various additives are employed to render the filling shelf-stable despite its moisture content. However, reducing the moisture content changes the taste and texture of the filling and moisture migration to the cooked dough in such products still occurs at ambient storage temperatures intended and causes the products to have undesirable textural and organoleptic qualities. In addition to these problems, the dough portion of the product, regardless of the formulation of the filling material, is subject to a variety of degradative processes which occur over time. Bread-like textures are especially sensitive to storage and cannot be stored in combination with intermediate or higher moisture fillings without severe loss of texture.

In view of these difficulties, the provision of frozen, pre-prepared filling/cooked dough products offers a viable alternative since, in theory, stability during storage can be assured for both the cooked dough portion and the filling portion, regardless of the moisture content thereof. Such products require only that the consumer either thaw the frozen product at room temperature or, for quick-thawing and/or for products desirably eaten hot, that the consumer place the product in a suitable heating apparatus.

In actual practice, frozen products in which a moisture-containing filling is arranged in or between a cooked dough piece or laminate have not met with a high degree of success. While the freezing process per se can generally be effected without difficulty, moisture migration between cooked dough and filling can still occur during frozen storage. Frozen storage as typically conducted results in the products going through a number of freeze/thaw cycles, during which the texture of both the filling and the dough will typically be degraded. Moreover, the reconstitution or reheating of the frozen product generally does not provide a product possessing the freshness and eating characteristics of the fresh, as-prepared product. During the reheating, moisture transfer from the dehydrating filling to the dough portion often results in a product in which the dough is very soggy and lacks the crispness or flakiness obtained in freshly-prepared products. Utilizing fillings of low moisture raises the earlier-noted problems as to products where a high moisture filling is desired, and also raises the problem that any degree of dehydration occurring during freezer storage leaves the product in an unprotected state leading to the undesired and well-known phenomenon of freezer burn.

The means by which reheating of a frozen cooked dough/filling product is effected itself has been found by us to have a profound effect on the texture and eating properties of the product, whereby even carefully formulated products become either too soggy or too crusty.

It would be desirable, therefore, to provide a product in which an edible, moisture-containing food filling is arranged in a cooked bread-like dough, which product is capable of being frozen and reheated in a manner which results in a final product possessing textural, visual and organoleptic properties closely resembling those associated with the freshly prepared product prior to freezing and reheating.

BACKGROUND ART

U.S. Pat. No. 2,834,677 to Geisler describes a frozen sandwich which is prepared by placing a chilled (or frozen) filling between slices of frozen bread and then placing the sandwich in sub-freezing storage before the bread has thawed so as to prevent the bread from being absorbent enough to pick up any moisture from the filling. The sandwich is thawed for consumption during which it is intended that the filling will reach consumable temperature at about the same time the bread becomes absorbent, so as to minimize the amount of time, prior to consumption, that liquid filling is in contact with absorbent bread. Such a product is difficult to assemble because of the use of frozen starting materials, limits the types of fillings which can be employed and is not useful for preparing frozen products intended to be consumed after a heating step.

U.S. Pat. No. 3,532,510 to Zimmerman describes a biscuit-like product in which a filling (e.g., peanut butter, cheese, meat) is surrounded by an unbaked dough and then refrigerated. Products of this type are of little interest in the field of consumer convenience products since they require cooking by the consumer at least sufficient to cook the dough to an edible form.

U.S. Pat. No. 3,615,679 to Tangel relates to a frozen food product in the nature of a pizza in which a tomato sauce and cheese filling is enclosed between two layers of a leavened dough. The product is partially baked and then frozen, and is intended to be heated and cooked to completion in a household toaster. Toaster products of this type generally result in excessive browning of the dough portions, a condition which is acceptable for only a limited number of products.

U.S. Pat. No. 3,656,967 to Barton et al provides a toaster product having an intermediate-moisture, humectant-containing filling enveloped in a baked pastry dough crust. The moisture contents of the crust and filling are suitably balanced such that the presence of the humectant in the filling will establish a migration of water from the crust to the filling during baking to achieve a crisp flaky crust surrounding a softened filling. The disclosure does not contemplate or achieve a sandwich-bread-like covering having a crust which has a crisp texture, and a distinct crumb portion which is soft, but not soggy. This desired texture cannot be achieved using the low-moistures and toaster heating disclosed by Barton et al.

U.S. Pat. No. 3,719,138 to Blaetz and Corbige describes a "toaster" sandwich in which a filling is arranged between two slices of bread, the inner facing surfaces of the bread having been coated with a hydrocolloid to cause the filling to adhere to the bread so that the sandwich can be heated in a vertical position without loss of filling. The sandwich is frozen, after which a thin water glaze is applied to the outer bread surfaces and the product returned to frozen storage. The water glaze is intended to prevent browning of the bread during toaster heating by cooling the bread exteriors. Products of this type are not particularly practical since the preparation is involved, and the overall size of the product and the bread portions are severely limited by the size constraints of the toaster slots.

U.S. Pat. Nos. 4,020,188 and 4,171,380 to Forkner relate to products in which a frozen filling is encased by a dough having a protective backing such that the dough can be cooked without affecting the filler. The products are then refrigerated and are intended for consumption in such state.

U.S. Pat. No. 4,207,348 to Vermilyea, et al describes a sandwich-like product specially adapted for reheating with microwave energy. A frozen filling is inserted into an unbaked dough envelope and the product then proofed and baked. The baked product can then be frozen and "reconstituted", after refrigerated tempering, in a microwave oven. As the patentees note, microwave heating directly from the frozen state adversely affects the product quality.

In U.S. Pat. No. 4,400,404, a frozen pizza is prepared by encasing paste-like pizza filling ingredients in a toroidal dough, cooking the product and then freezing it. For consumption, the frozen product is further cooked at about 500° F. for 15 minutes.

European Patent Application No. 0 088 361, published Sept. 14, 1983, describes a breakfast pastry in which a cooked laminated dough and roll in shortening shell encases a thickened pastry-type (e.g., fruit-flavored) filling having specified gum and starch ingredients, a moisture of 30 to 50%, a relatively low pH and a viscosity falling within specified ranges. The product is fried and then frozen and, apparently, heated in a toaster for consumption. The laminated dough is said to be important to the achievement of final product quality.

Several patents disclose heating techniques which employ conductive as well as microwave energy application; however, none are directed to the preparation of a sandwich with a high-moisture filling and an outer bread covering wherein the bread has typical fresh crust and soft, but not soggy, interior portions. Among these are British Patent Specification No. 1,506,037 which relates to a method for defrosting precooked frozen foods in which the frozen food is first subjected in a convection chamber to conductive heating followed by simultaneous application of conductive and dielectric (microwave) heating. Also, U.S. Pat. No. 4,390,555, describes a variety of sequences of defrosting and heating and provides a series of special utensils for achieving uniform complete heating of various food products. The techniques for formulating a filled sandwich of the type described herein and for heating it to achieve a fresh baked texture after months of storage are not disclosed.

DISCLOSURE OF THE INVENTION

In the present invention, a filled uncooked bread dough and high-moisture filling intermediate composite product is prepared by providing an uncooked leavened dough and completely enveloping within such dough a filling comprised of a freeze/thaw stable viscous mixture of particulate cooked food pieces and a flavored sauce containing a water-binding carbohydrate. The leavened dough is formulated so as to provide, after subsequent cooking, a bread-like cooked dough having a distinct surrounding crust and a tender internal crumb structure, and contains a sugar or other sweet carbohydrate to enhance the flavor of the eventually cooked product and, to some degree, to aid in moisture retention in the cooked dough. The composite intermediate product is then treated in a manner suitable for developing a bread-like crumb texture in the dough, such as additional proofing followed by baking, deep-fat frying or the like, to produce a cooked filled product suitable for consumption.

The filled cooked dough product may at this point be frozen for distribution and storage, and then returned to a consumable state by heating. As a result of the manner of preparing the fresh product and the formulation of its components, the frozen product is capable of being reheated in a manner which results in a consumable product having properties very similar to those of the freshly-prepared products and avoiding the many problems attendant prior art products of this general type such as sogginess of the cooked dough portion, excessive browning of the dough portion, insufficient thawing/heating of the filling and the like.

In particular, it has been found that if the frozen cooked dough filled product is reheated by a combined application of microwave heat energy and conventional oven heat, and preferably by a first application of microwave heating followed by a second, brief period of conventional (e.g., oven) heating, the reheated product can be made to possess a completely heated interior filling and a surrounding bread covering having a distinct outer dry crust and an inner soft crumb, i.e., a product very similar to that obtained after cooking in the initial fresh preparation of the product.

DETAILED DESCRIPTION OF THE INVENTION

In preparing the intermediate composite dough/filling product of the invention, a leavened dough is employed which is preferably of the general type used in making breads of the French and Italian varieties. The essential components of the dough are flour, water, leavening (preferably yeast) and a sugar, and additional ingredients such as dough conditioners, emulsifiers, oil or shortening and the like are desirably present to provide a cooked dough possessing predetermined taste and textural properties.

The flour may be any of the types commonly employed in bread or pastry making, but preferably is a high protein type containing, for example, from about 11% to 15% protein by weight. The yeast employed preferably is an active dried yeast, but bulk or compressed yeast may also be used.

While the dough is preferably yeast leavened as is high quality bread, chemical leavening systems can be employed alone or in combination with yeast according to known techniques which provide, upon baking, a good bread-like texture with a dry, slightly firm crust and a soft, tender inner crumb structure. In this regard, and with regard to alternative methods of preparation of the bread, the disclosures of U.S. Pat. Nos. 4,393,084 and 4,404,227 to Pomper and LaBaw are incorporated by reference.

The dough employed in the invention generally will be formulated with somewhat greater amounts of a sugar than are typically employed in making breads per se (particularly with respect to breads of the Italian or French variety). The preferred sugar is sucrose, but other sweet mono-, di-, or oligosaccharides or other types of carbohydrates may also be employed. The level of sugar in the dough is chosen so as to enhance dough flavor and to contribute to moisture retention in the crumb of the cooked dough. Generally, the dough will contain from about 4.0% to about 12% sugar by weight, and preferably will contain from about 6% to about 9% sugar by weight.

The fillings employed in this invention are deliberately formulated so as to contain a high degree of moisture, primarily provided by the sauce in which particulate food ingredients are distributed. In order to minimize moisture migration from the filling to the dough during preparation, cooking and eventual freezing and reheating, the filling is formulated so as to be relatively viscous and to possess water binding and/or $A_w$ lowering ingredients designed to minimize differences between the respective free water concentrations in the dough and filling portions. In aid of such considerations, the dough portion of the product may, as earlier noted, contain a relatively high level of a sugar component to aid in moisture retention in the cooked dough. In addition, it may be desirable to utilize during dough preparation a relatively higher level of water than typically employed in making breads of the French or Italian varieties.

In terms of essential ingredients, the dough used in the present invention will, in its preferred execution, contain from about 45% to about 65% by weight of a high protein flour, from about 25% to about 45% water, from about 6% to about 12% of a sugar and from about 1% to 2% of an active dried yeast. Optional, yet desirable, additional ingredients include emulsifiers (preferably lecithin) and an oil or shortening ingredient, each of which is employed at relatively low levels in the dough.

In processing the dough for acceptance of the filling and eventual cooking, any of the known bread-making techniques may be employed, including those of U.S. Pat. Nos. 4,393,084 and 4,404,227 referred to above. In addition to the straight dough method, the process of U.S. Pat. Nos. 4,393,084, has been employed with success. The straight dough procedure (as illustrated in examples presented hereinafter) calls for the mixed ingredients to be proofed at about 90° F. to 100° F. and the proofed dough then punched down and sheeted for receipt of the filling.

The fillings employed in the present invention are cooked, freeze/thaw stable viscous mixtures of particulate food ingredients and a sauce containing a water-binding carbohydrate. The moisture content of the fillings will preferably be greater than 50%, and most preferably from about 55 to about 80%. The food ingredients can be chosen from a wide variety of materials such as meats, vegetables, eggs, cheeses, fish and the like, and the combination of food ingredients and sauce can be formulated so as to result in a filling recognized and perceived as a type with which consumers are particularly familiar, such as creamed chicken, chili and hot dogs, ham and eggs, etc.

The sauce used in the filling portion of the product of this invention is preferably of a heavy thickened variety to facilitate processing and produce an overall viscous filling while at the same time providing a high degree of moisture in the filling. The sauce itself may contain some quantity of particulate food ingredients, but is still denominated a "sauce" as used herein since it generally will be prepared separate from the major particulate food ingredients of the filling.

The fillings of the present invention are formulated so as to be freeze/thaw stable, i.e., to be capable of being frozen and thawed without adverse affect on their textural and organoleptic properties. Such freeze/thaw stability is principally of importance since the cooked dough/filling products are specifically intended to be frozen after their preparation and ultimately reheated at the point of consumption. In addition, however, the product may conceiveably undergo a number of freeze/thaw cycles such as may occur during transit from point of manufacture to point of distribution or sale or which may occur at point of distribution or sale as products which have been left by the distributor or seller for too long a period of time between receipt from the manufacturer and placement in the distributor or seller's frozen storage. As a consequence, the preferred execution of the invention will take these situations into account and provide a degree of freeze/thaw stability generally sufficient to substantially resist adverse textural and organoleptic changes for up to at least about three freeze/thaw cycles.

The conferring of freeze/thaw stability to the filling preferably is effected by inclusion therein of a water-binding carbohydrate such as a modified food starch derived from, e.g., waxy maize, corn, arrow root and other like materials. Modified food starches are preferred for a number of reasons and will be employed, typically at levels of from about 5 to about 12 percent, and most preferably about 7 to about 10 percent, of the weight of the sauce, not including particulate additions. Auxiliary agents such as hydrophilic colloids also may be employed in total or partial substitution for the modified starch. The primary purpose of these relatively high molecular weight carbohydrates is to preserve texture during freeze/thaw cycling, and not to so-greatly increase the osmotic pressure of the filling as to prevent moisture migration from the high moisture filling into the dough. In fact, during reheating after freezing, moisture is permitted to migrate from the filling into the dough to provide softening without making the dough soggy.

The water-binding carbohydrate is conveniently included in the sauce portion of the filling since it is in that portion that sufficient moisture will be present to effect hydration of the carbohydrate and since it is in any event generally desirable that the sauce be of a thickened consistency of the type provided by inclusion of a carbohydrate therein. The particulate food pieces of the filling may also, however, include ingredients which aid in freeze/thaw stability, particularly when the food pieces are of the type which are prepared in a manner which permits inclusion directly therein of a suitable water-binding carbohydrate (for example, where the food pieces comprise a sub-divided egg product, such as a scrambled egg, in which the raw egg mixture can include an added water-binding carbohydrate or where the food pieces comprise reassembled meat or protein products, etc.).

As earlier noted, the filling is formulated in a manner such that a degree of water-binding and $A_W$ lowering is achieved which lowers the difference in the concentrations of available free water between the filling and the cooked dough surrounding casing, while not preventing migration. Generally, the water-binding carbohydrate used to confer freeze/thaw stability to the filling will also serve as the ingredient which effects the requisite water activity and binding properties for this purpose. It is possible to employ osmotic and water-binding agents in addition to those used to impart freeze/thaw stability; however, with the moisture contents of the fillings being on the order of about 50 to about 85% by weight, the water activity of the filling will preferably be substantially higher than that of the bread such that at ambient or higher temperatures, moisture tends to migrate to the bread from the filling.

In preparing the intermediate uncooked dough composite of the invention, the previously described dough will be sheeted and cut to an appropriate size, after which a predetermined portion of filling will be deposited thereon. The dough is then formed around the filling in a manner which completely encloses the filling, thereby reducing the tendency of any leakage of liquid components of the filling and, for products which are thereafter cooked and frozen, reducing the possibility that any exposed filling portions would be subject to freezer burn during storage. Generally, the weight ratio of dough to filling in the composite product will be on the order of from about 1.5:1 to about 3:1, and preferably from about 1.8:1 to about 2.3:1. These ratios may be varied over wide ranges, however, depending upon the particular product sought to be produced.

In preparing the composite uncooked dough product for either immediate consumption and/or for subsequent freezing, the composite will be treated in a manner appropriate for developing a surrounding surface crust structure on the dough portion and the development of a cellular crumb structure within the dough mass, while also effecting heating of the filling. Typically this can be accomplished through conventional baking procedures for bread or, for example, deep-fat frying, generally after additional proofing of the product and, if desired, application of a coat of, e.g., egg or butter to the dough casing.

The resultant cooked filled product presents a cooked dough texture very much like that of freshly-baked Italian or French breads or hard rolls in that a slightly firm crust is developed along with a tender interior crumb structure. The eating qualities of the product are exceptionnaly good in that the filling is of high moisture and excellent flavor impact.

To produce a frozen product capable of being reheated to return the product to one very much like its freshly-prepared counterpart, any conventional method of freezing food products may be employed, and preferably those which effect freezing in a relatively rapid manner. In its frozen state, the product is very stable, exhibiting little if any moisture migration and/or dehydration which would adversely affect the ability to reheat the product to its freshly-prepared state, and is capable of undergoing freeze/thaw cycling without deleterious effects.

In accordance with the present invention, it has been found that a particular reheating process for frozen cooked dough/filling products is uniquely capable of providing a final product having freshly-prepared qualities. In the preferred reheating process of the present invention, the frozen product is first subjected to the influence of microwave energy for a period of time sufficient to thaw the filling without effecting substantial dehydration thereof, and thereafter subjected to conventional oven heat (of the conductive, convective or radiant-type produced in conventional home ovens) for a brief period of time sufficient to effect dehydration of the exterior cooked dough to a degree sufficient to provide a slightly firm surface crust thereon. In our studies of a variety of reheating procedures, it was found, for example, that reheating via microwave energy alone produces an overall soft bun-like texture to the surrounding cooked dough as a consequence of excessive moisture transfer from the filling into the dough and fails to provide the desired crust required to simulate the nature of the freshly-prepared product. Using conventional oven heat energy alone, on the other hand, requires an excessively long time to bring the frozen filling to a consumable temperature, during which time the dough portion becomes overly dehydrated, crusty throughout and undesirably surface-darkened.

The precise periods of time required for each of the heating steps will, of course, vary depending upon dough and filling formulation, overall size of the individual frozen product and the number of individual frozen products being reheated in the particular apparatus at one time, and hence cannot be readily generalized. Simply by way of example, an individual frozen product containing 100 grams of cooked dough surrounding 50 grams of filling generally will require about two minutes of exposure to each type of heating at conventional settings for heating bread-like products.

It also has been found that these same desirable reheating effects can be achieved utilizing simultaneous application of microwave and conventional oven heat to the frozen cooked dough/filling product (and/or periods within the microwave to conventional oven heat sequence where simultaneous heating by these energy forms occurs). Again, the extent and degree of the microwave portion of the reheating is that sufficient to thaw the filling portion of the product without causing a substantial degree of moisture vapor loss which must pass through the cooked dough, while the conventional oven heat is such as to bring about the desired dry crust formation around the cooked dough portion (and also to effect, if necessary, additional dehydration of moisture which may have passed to the cooked dough portion as a consequence of the microwave heat).

In order to facilitate understanding of the essential features of the invention, a number of illustrative examples are hereinafter presented.

EXAMPLE I

A cooked dough product containing a ham and egg filling is prepared as follows.

A dough is first prepared utilizing the ingredients shown below in the respective amounts (weight percents):

| High Gluten Flour | 57.22 |
|---|---|
| Water | 35.29 |
| Sugar | 4.29 |
| Vegetable Oil | 1.72 |
| Active Dried Yeast | 1.34 |
| Lecithin | 0.14 |

The yeast-leavened dough was prepared by a typical straight dough method in which the ingredients were mixed (Hobart mixer, no. 3 setting) for about twenty minutes and the resultant mixture proofed at about 90° F. to 100° F. for 75 minutes. The raised dough was then punched and sheeted.

For preparing the filling portion of the product, a sauce is made from the following ingredients (weight percents):

| Butter | 7.06 |
|---|---|
| Heavy Cream | 23.53 |
| Half and Half | 58.82 |
| Modified Food Starch | 9.41 |
| Salt | 1.18 |

The Half and Half is warmed and, in a separate pan over low heat, the butter is melted and the starch stirred in. Stirring was continued until foaming subsided without browning the roux. The warmed Half and Half is then added while stirring continues until an extra heavy smooth sauce is formed. The sauce is removed from the heat and the heavy cream and salt then slowly stirred in until smooth.

Particulate filling ingredients were prepared by separately forming a meat combination (50% diced boiled ham; 40% diced American cheese; 10% bacon chips, percents by weight) and an egg combination (a mixture of 84.13% by weight raw egg and 15.87% by weight butter, soft scrambled.)

The overall filling was prepared by blending together 17.30% by weight of the sauce, 17.30% by weight of the meat combination and 65.40% by weight of the egg combination.

Fifty grams of the filling was placed on a portion of the sheeted dough (100 grams) and the dough wrapped completely around the filling. This composite was proofed for 30 minutes at 100° F. (90% RH) and a thin egg wash then applied to all surfaces. The product was then baked in a conventional oven at 350° F. for 15 minutes and thereafter allowed to cool.

This freshly-prepared product had a firm and palatable crust and an interior tender crumb surrounding a moist and flavorful ham and egg filling.

EXAMPLE II

A number of cooked products prepared according to Example I were frozen in the freezer compartment of a household refrigerator/freezer and then reheated by a number of techniques as follows:

Method A—Frozen sample placed in household microwave oven (at high setting; 2 minutes). The defrosted sample is then placed in a conventional household oven (preheated to 450° F.) for 2 minutes.

Method B—Frozen sample placed in microwave oven at "full" setting for 2 minutes.

Method C—Three frozen samples were placed in a conventional oven (preheated to 400° F.) and individual samples removed at (1) 10 minutes; (2) 15 minutes; and (3) 20 minutes.

Method D—Three frozen samples were placed in a conventional oven (preheated to 350° F.) and individual samples removed at (1) 20 minutes; (2) 25 minutes; and (3) 30 minutes.

In evaluating the texture and eating characteristics of these samples, the following results were obtained. For Sample D(1) (20 minutes, 350° F. oven), the interior filling had not warmed to a consumable temperature; in Sample C(1) (10 minutes, 400° F.), the filling was still frozen and, for Sample C(2), the filling had not warmed to a consumable temperature. For Samples C(3), D(2) and D(3), the filling had warmed to an acceptable temperature, but the exterior cooked dough coating had in all cases developed an undesirably dry crumb and a badly carmelized thick, hard crust quite unlike that of the freshly-prepared product.

Sample B (microwave only) possessed a very hot interior filling but had developed a soft texture throughout the entirety of the cooked dough portion. Sample A, according to the present invention, produced a product in which the cooked dough texture was judged equal to that of the freshly-prepared product and in which the filling was heated to a desirable eating temperature.

EXAMPLE III

A cooked dough having a creamed chicken filling was prepared using the dough and sauce of Example I as well as the procedures therein. The filling comprised 33.86% by weight of the sauce and 36.12% by weight diced cooked white chicken meat, 23.93% by weight frozen cooked peas and carrots and 6.09% by weight chopped chicken skin.

The foregoing product, when baked according to Example I and eaten fresh, had a slightly firm crust and tender crumb structure, and the filling had a creamy aroma and a tender meat texture. Frozen products prepared from these freshly-prepared products and reheated according to the procedure for Sample A in Example II possessed a similar appearance, texture and eating quality as the fresh-prepared product. Frozen products reheated according to the procedures for Sample B (Example II) had a soft crust unlike that of the freshly-prepared product and frozen products reheated according to the procedures for Sample C(3) possessed an unacceptable hard, dark-brown crust.

In like manner, cooked dough products having a chili dog and chili burger filling, respectively, also were prepared with excellent results.

EXAMPLE IV

A cooked dough having a barbequed pork filling was made by first preparing diced barbequed pork pieces from marinated strips of boneless pork loin. The strips were placed on the upper rack of a conventional oven (475° F.–500° F.) over a pan of water arranged on the lowest rack position of the oven. After cooking for 30 minutes, the pieces were cooled and diced.

A sauce was prepared from the following ingredients (weight percentages):

| | |
|---|---|
| Bacon Fat | 5.77 |
| Modified Food Starch | 7.69 |
| Water | 67.31 |
| Sugar | 5.77 |
| Soy Sauce | 3.85 |
| Teriyaki Sauce | 7.69 |
| Caramel | 1.92 |

A roux was made from the fat and starch and the water (hot) then stirred in, after which all remaining ingredients are stirred in until a smooth sauce is obtained.

A filling is prepared from 51.32% by weight of the pork pieces; 26.31% by weight of the sauce; 17.11% by weight sauteed onions; and 5.26% of the sauce used for marinating the pork pieces.

Fifty (50) grams of this filling are arranged in a sheeted dough (straight-dough method) (100 grams) prepared from the following ingredients (percents by weight):

| | |
|---|---|
| High Gluten Flour | 54.50 |
| Active Dry Yeast | 1.28 |
| Water | 33.61 |
| Sugar | 8.84 |
| Vegetable Oil | 1.64 |
| Lecithin | 0.13 |

The dough completely encloses the filing, and the composite is proofed for 45 minutes at 100° F. (90% RH). An egg wash is applied to the surfaces and the composite is baked for 15 minutes at 350° F.

The as-prepared product had excellent eating properties and texture (firm crust, tender crumb), which were duplicated when the product was frozen and subsequently reheated for 2 minutes in a microwave oven (high) and 2 minutes in a conventional oven (450° F.).

In accordance with earlier-discussed variations, the reheating sequence for frozen cooked dough/filling products can also take the form of simultaneous application of microwave and conventional oven heating. As used herein, the term "conventional oven heating" is intended to describe the type of heating which takes place in a typical (non-microwave) household oven as opposed to intending to describe a particular apparatus per se. As is apparent, any apparatus wherein such heating effects as occur in household ovens (be they convective, conductive, radiant or combinations thereof) are similarly present is suitable for use in the reheating process of the present invention.

The specific embodiments and examples set forth herein are intended to be illustrative of the many variations which can be practiced within the scope of the invention, which scope is defined in the appended claims.

What is claimed is:

1. A method for preparing a filled cooked dough product having a high-moisture filling and an outer casing of bread having a bread-like crust and soft internal crumb, comprising the steps of:
   (a) providing a leavened uncooked dough capable of being cooked to a bread-like product having a firm crust and a tender interior crumb;
   (b) providing an edible filling comprising a viscous freeze-thaw stable mixture of particulate food ingredients and a water-containing sauce therefor containing a water-binding carbohydrate;
   (c) completely enveloping said filling within said uncooked dough;
   (d) cooking said enveloped product to an extent sufficient to bring about development in said dough of a firm crust exterior and a tender interior crumb structure;
   (e) freezing said cooked product; and
   (f) reheating said frozen cooked product to achieve a firm outer crust and a tender non-soggy bread-like crumb in the cooked dough and to achieve a defrosted filling within said cooked dough, both being at a temperature desired for consumption by a method selected from either (1) first subjecting said frozen product to microwave heating and thereafter subjecting said product to non-microwave oven heating or (2) subjecting said frozen product simultaneously to microwave heat and non-microwave oven heating, whereby the microwave heating is sufficient to thaw the filling portion of said product without effecting substantial dehydration thereof and the non-microwave oven heating is sufficient to bring about a crust and crumb structure in said reheated product closely resembling that existing after the cooking of step (d).

2. The method according to claim 1 wherein the weight ratio of said uncooked dough to said filling in said enveloped product of step (c) is in the range of from about 1.5:1 to about 3:1.

3. The method according to claim 2 wherein said uncooked dough is a yeast leavened dough which contains from about 25 to about 45% water and from about 4 to 12% sugar by weight.

4. The method according to claim 3 wherein the filling has a moisture content of from about 55 to about 80% by weight and water-binding carbohydrate in said filling comprises a modified starch which is present in an amount of about 7 to about 10% of the weight of the sauce not including the particulate food ingredients.

5. The product prepared according to the process of claim 1.

6. A method for preparing a filled cooked dough product having a high-moisture filling and an outer casing of bread having a bread-like crust and soft internal crumb, comprising the steps of:
   (a) providing a yeast-leavened uncooked dough capable of being cooked to a bread-like product having a firm crust and a tender interior crumb;
   (b) providing an edible filling having a moisture content of from about 55 to about 80% and comprising a viscous freeze-thaw stable mixture of particulate food ingredients and a water-containing sauce therefor containing from about 5 to about 12% of a modified starch based on the weight of the sauce not including the particulate food ingredients;
   (c) completely enveloping said filling within said uncooked dough at a dough to filling ratio of about 1:5 to 3:1 uncooked dough;
   (d) cooking said enveloped product to an extent sufficient to bring about development in said dough of a firm crust exterior and a tender interior crumb structure;
   (e) freezing said cooked product; and
   (f) reheating said frozen cooked product to achieve a firm outer crust and a tender non-soggy bread crumb in the cooked dough and to achieve a defrosted filling within said cooked dough, both being at a temperature desired for consumption by a method selected from either (1) first subjecting said frozen product to microwave heating and thereafter subjecting said product to non-microwave oven heating or (2) subjecting said frozen product simultaneously to microwave heat and non-microwave oven heating, whereby the microwave heating is sufficient to thaw the filling portion of said product without effecting substantial dehydration thereof and the non-microwave oven heating is sufficient to bring about a crust and crumb structure in said reheated product closely resembling that existing after the cooking of step (d).

7. The product prepared according to the process of claim 6.

* * * * *